Jan. 12, 1943.　　　S. T. CARTER　　　2,308,154
MECHANISM FOR HANDLING AND FEEDING BOTTLES AND OTHER CONTAINERS
Filed Sept. 24, 1941　　　8 Sheets-Sheet 1

FIG. 1.

INVENTOR
Sidney T. Carter
BY Mock. Blum
ATTORNEYS

Jan. 12, 1943. S. T. CARTER 2,308,154
MECHANISM FOR HANDLING AND FEEDING BOTTLES AND OTHER CONTAINERS
Filed Sept. 24, 1941 8 Sheets-Sheet 3

FIG. 4.

INVENTOR
Sidney T. Carter
BY
ATTORNEYS

Jan. 12, 1943.  S. T. CARTER  2,308,154
MECHANISM FOR HANDLING AND FEEDING BOTTLES AND OTHER CONTAINERS
Filed Sept. 24, 1941  8 Sheets-Sheet 4

FIG. 5.

INVENTOR
Sidney T. Carter
BY Mock & Blum
ATTORNEYS

Jan. 12, 1943.                S. T. CARTER                2,308,154
MECHANISM FOR HANDLING AND FEEDING BOTTLES AND OTHER CONTAINERS
Filed Sept. 24, 1941                8 Sheets-Sheet 6

INVENTOR
Sidney T. Carter
BY Nocko Blum
ATTORNEYS

Jan. 12, 1943. S. T. CARTER 2,308,154
MECHANISM FOR HANDLING AND FEEDING BOTTLES AND OTHER CONTAINERS
Filed Sept. 24, 1941 8 Sheets-Sheet 8

FIG.11.

INVENTOR
Sidney T. Carter
BY
ATTORNEYS

Patented Jan. 12, 1943

2,308,154

UNITED STATES PATENT OFFICE 2,308,154

MECHANISM FOR HANDLING AND FEEDING BOTTLES AND OTHER CONTAINERS

Sidney T. Carter, Frankfort, Ky., assignor to Schenley Distillers Corporation, New York, N. Y., a corporation of Delaware Application September 24, 1941, Serial No. 412,088

6 Claims. (Cl. 198—22)

My invention relates to a new and improved mechanism for handling and feeding bottles and other containers.

One of the objects of the invention is to provide such improved means in a machine which is used for labelling bottles and for other purposes.

Another object of the invention is to provide a mechanism which has, in succession, inlet conveyor means on which the bottles are spotted; inlet transfer mechanism which transfers the spotted bottles to a turntable conveyor or other type of conveyor, on which conveyor the respective bottles are held spaced from each other and in spotted relation; outlet transfer mechanism which transfers the bottles, after they have been labelled on the turntable or the like, in unspotted relation to first outlet conveyor means, which feed the unspotted bottles; and second outlet conveyor means, on which the bottles are spotted and inspected. The second outlet conveyor means preferably comprises a plurality of units, and the bottles are delivered successively from the first outlet conveyor means to the respective units. While the containers are held spotted on the turntable, they may be stamped or marked or identified by affixing labels, stamps, viscose bands and the like to said containers.

Other objects of the invention will be set forth in the annexed description and drawings, which illustrate a preferred embodiment thereof.

It is to be understood that whenever I refer to a bottle, I include any other type of container.

The mechanism for feeding the bottles to the turntable, and for spotting the bottles prior to the delivery of the bottles to the turntable, is of the general type shown in U. S. Patent No. 2,159,318 issued on May 23, 1939, so that a detailed description thereof is not necessary.

Figure 2:
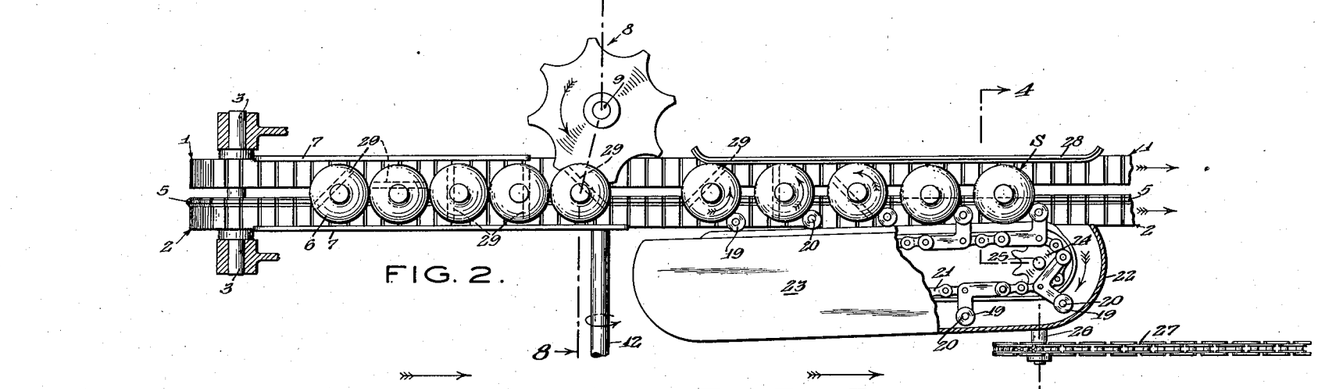
Fig. 2 is a view of the left-hand part of Fig. 1, on an enlarged scale.
Figure 3:
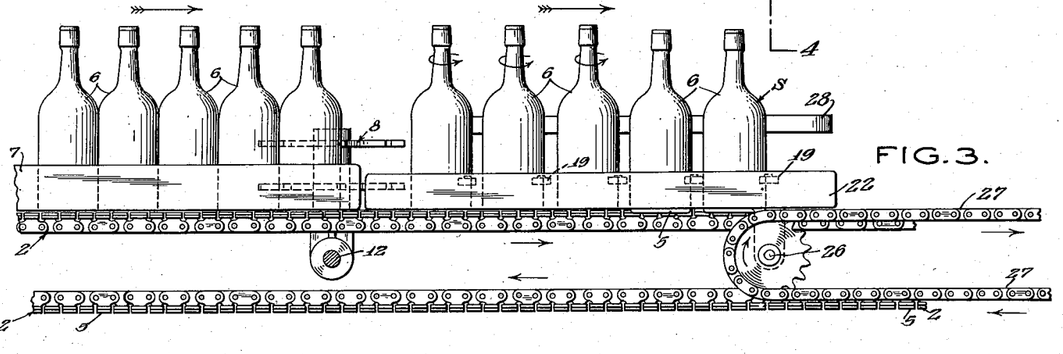
Fig. 3 is a side elevation of Fig. 2.

As an improvement over the mechanism illustrated in U. S. Patent No. 2,159,318, the inlet conveyor means disclosed herein consist of a plurality of parallel endless chain conveyors 1 and 2, of the same general type as the chain conveyor which is illustrated in U. S. Patent No. 2,159,318. These endless chain conveyors 1 and 2 are supported by a sprocket (not shown) which is mounted upon the shaft 3, and by a companion sprocket which is mounted upon the shaft 4. The links of the chain 2 are provided with spotting ribs 5, at the longitudinal edges of said links which are adjacent the companion chain 1. The conveyor 1 is not provided with any spotting ribs. The bottles 6 have their bottom walls provided with grooves 29, and said grooves 29 are engaged by the ribs 5 in order to spot the bottles. Referring to Fig. 2, the bottle which is in the position indicated by the reference letter S, is in the spotted position. The next preceding bottle is also in the spotted position. The groove 29 of each bottle is off-center, and the vertical axis of the bottle is located in the space between the inlet conveyors 1 and 2.

Figure 8:
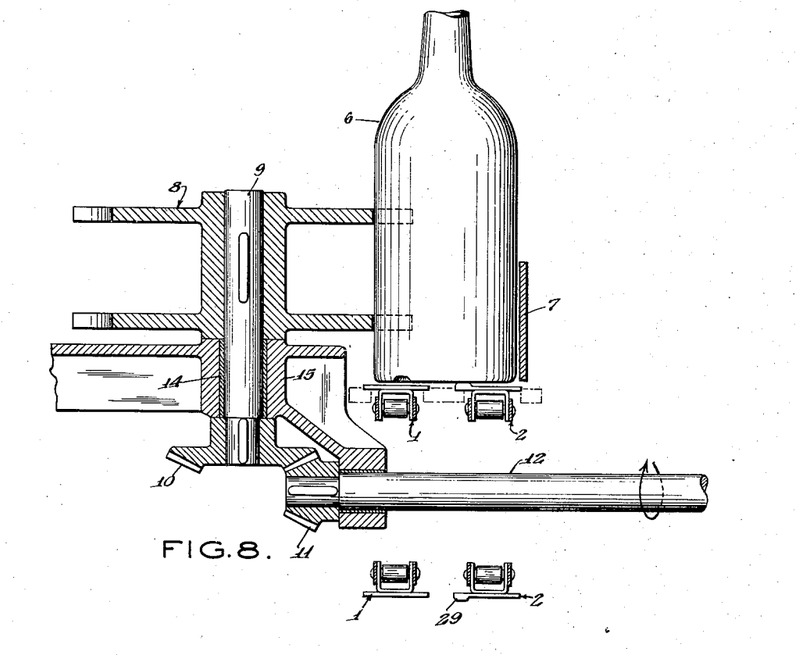
Fig. 8 is a sectional view, partially in elevation, on the line 8—8 of Fig. 2.

The bottles 6 are placed by hand upon the inlet chain conveyors 1 and 2, whose top runs move from left to right. The bottles are prevented from falling off the conveyor chains by fixed side rails 7. The bottles are then automatically spaced from each other by means of the spacing wheel 8. This spacing wheel 8 is detachably fixed to a vertical shaft 9. As shown in Fig. 8, the spacing wheel 8 has two superposed flanges, whose peripheries are shaped to provide pockets for partially receiving the respective bottles 6. The vertical shaft 9 is provided at its bottom end with a bevel gear 10 which is fixed to said shaft 9 and which meshes with bevel gear 11 which is keyed to the horizontal shaft 12. The shaft 9 is journalled in a bearing 14 which is fixed to the frame 15 of the machine. The hub of the spacing wheel 8 is detachably fixed to the shaft 9 in any suitable manner, and said hub of the wheel 8 is provided with a boss which rests turnably upon frame 15. The horizontal shaft 12 is provided with a sprocket which is fixed to said shaft 12 and which has a hub 16. This sprocket meshes with a chain 17 which meshes with a sprocket having a hub 18 and which is fixed to the shaft 4.

The effective gear ratios between the respective shafts of the mechanism will be later more fully described.

Figure 1:
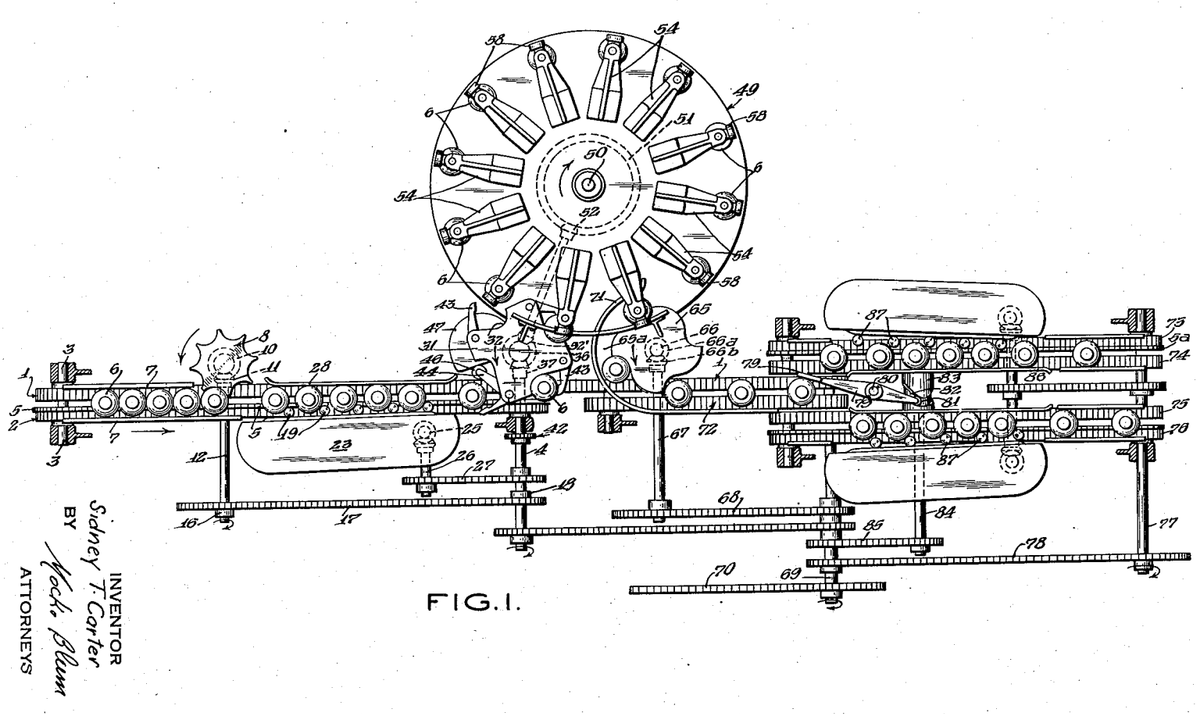
Fig. 1 is a top plan view of the improved machine.

The spacing wheel 8 automatically spaces the bottles, by intermittently feeding the bottles more slowly than the feed of the inlet chain conveyors 1 and 2, as shown at the right of said spacing wheel 8 in Fig. 1, so that the top runs of chains 1 and 2 can slip relative to the bottom walls of the bottles. The spaced bottles are turned around their respective vertical axes while said bottles contact with turnable rolls 19, which are mounted on respective vertical pivot pins 20. These pivot pins 20 are connected to the respective links of a horizontal endless chain 21. As shown in Fig. 2, selected links of the chain 21 are provided with lugs which are offset laterally and outwardly, and the pivot pins 20 are mounted upon these lugs. The chain 21 is located movably within a casing 22, which has a cover 23. The chain 21 is endless, and it is held upon a pair of sprockets 24, one of which is shown in Fig. 2. As indicated diagrammatically in Fig. 1 and Fig. 4, the vertical shaft 25 of one sprocket 24 is provided with a bevel gear 25a which is fixed to said shaft 25 and which meshes with a corresponding bevel gear 26a which is fixed to the horizontal shaft 26. This horizontal shaft 26 is driven by a sprocket and chain drive which includes the chain 27, from the shaft 4. Fixed superposed rails 28 are provided at one longitudinal edge of the chain conveyor 1. The bottles contact frictionally with the friction facings 30 of said rails 28 so that the respective bottles 6 are rotated about their respective vertical axes, while each bottle contacts with a respective rotatable roll 19. These rolls 19 maintain the proper spacing between the bottles.

Each bottle is thus rotated around its respective vertical axis, until a spotting rib 5 enters the recess 29 which is provided in the bottom wall of the respective bottle.

Figure 4:
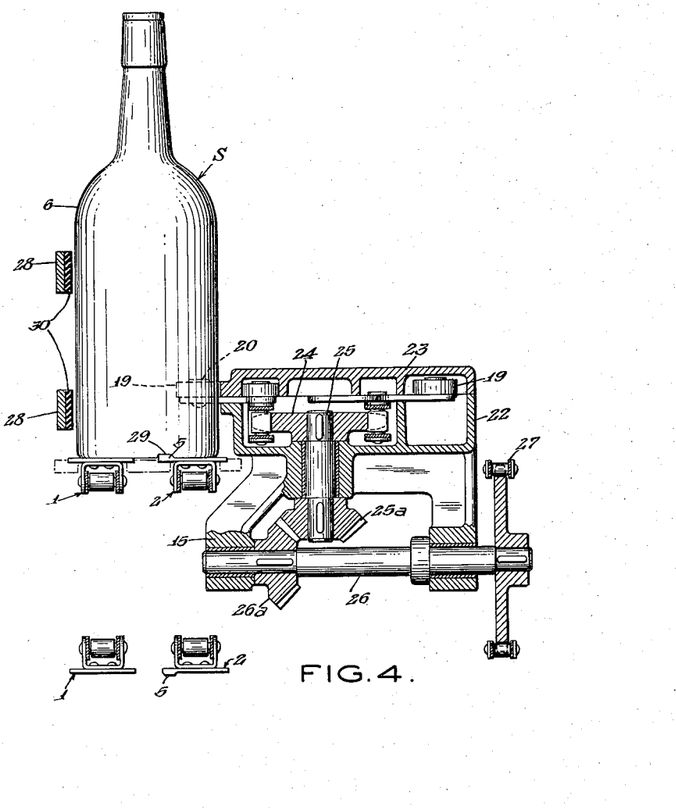
Fig. 4 is a sectional view on the line 4—4 of Fig. 2.

When a bottle 6 is engaged and spotted by a rib 5, the bottle is spaced laterally from the rails 28, so that the rotative force on the respective bottle is discontinued. As shown in Fig. 4, each groove 29 has an upstanding wall which is inclined relative to the vertical axis of the respective bottle. Each rib 5 has a corresponding inclined wall, so that the entry of a rib 5 into the groove 29 of the respective bottle, automatically shifts said bottle laterally away from rails 28.

After each bottle has been spotted, it is transferred, while it is maintained in spotted position, to the turntable 49. Each bottle is held in spotted position, while it is located on said turntable. The bottles are transferred to the turntable 49, from the inlet conveyor mechanism, by inlet transfer mechanism.

As shown in Fig. 1, the inlet conveyor 1, which is free from the spotting ribs, continues beyond the turntable 49. This conveyor 1, in addition to being a part of the inlet conveyor mechanism, is therefore also a part of the first outlet conveyor means, which receive the bottles from the outlet transfer mechanism. The inlet chain conveyor 2, which is provided with the spotting ribs 5, terminates at the inlet transfer mechanism, which transfers the spotted bottles to the turntable. This inlet transfer mechanism is shown in detail in Figs. 5 and 6, and it comprises an inlet transfer member and auxiliary means.

Figures 6, 7:
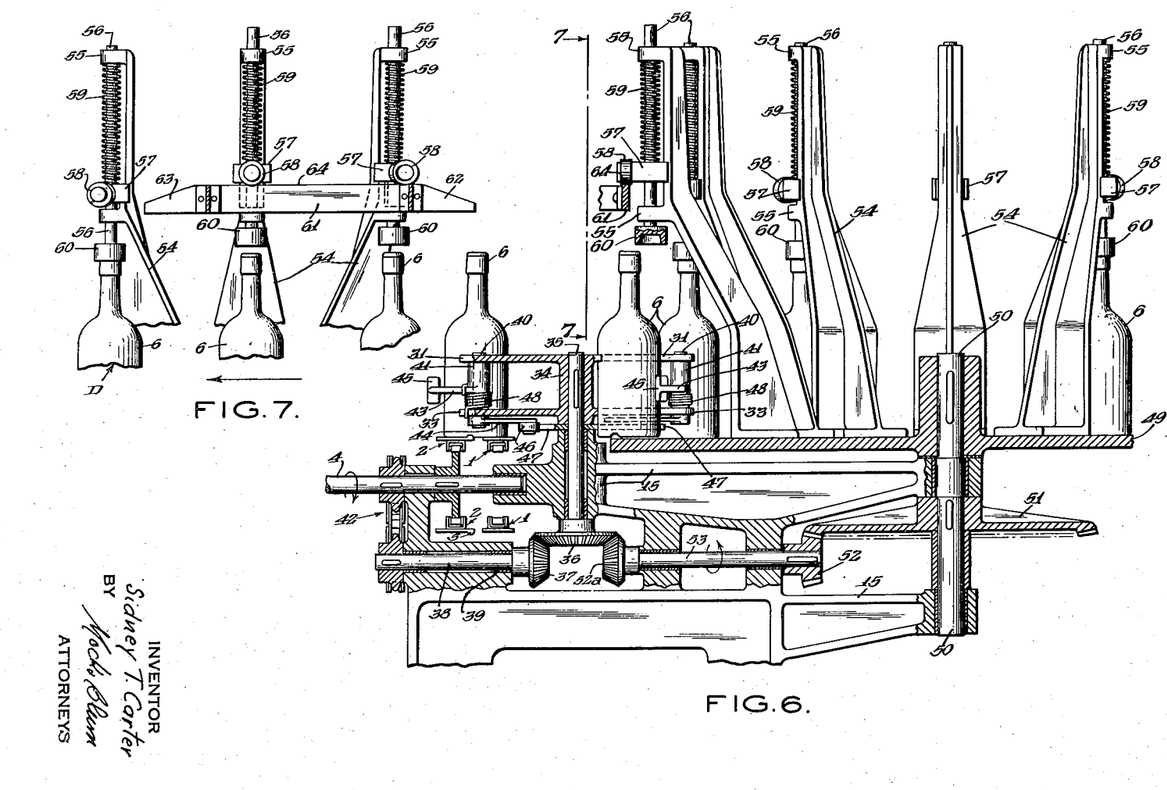
Fig. 6 is a sectional view on the line 6—6 of Fig. 5.
Fig. 7 is an elevation on the line 7—7 of Fig. 6.

The inlet transfer member comprises superposed plates 31 and 33, which have vertically alined pairs of pockets 32. As shown in Fig. 6, the plates 31 and 33 are provided with a common hub 34, which is keyed to a vertical shaft 35, which is journalled in the frame 15 of the machine. Shaft 35 is provided with a bevel gear 36 which is fixed to said shaft 35 and which meshes with a bevel gear 37 which is fixed to a horizontal shaft 38. This shaft 38 is mounted in bearings 39 which are suitably affixed to the frame 15 of the machine. Shaft 38 is driven by shaft 4 through chain 42, which meshes with sprockets on said shafts 38 and 4. Plates 31 and 33 carry studs 40, which extend through sleeves 41, which are freely turnable relative to the studs 40, and which are also turnable relative to the plates 31 and 33. Each sleeve 41 is rigid with a pair of arms 43 and 44, so that each pair of arms 43 and 44 turns in unison with the respective sleeve 41, and the angle between the arms 43 and 44 of each pair remains constant. Each arm 43 is provided with an integral clamping shoe 45, whose clamping face may have a layer of rubber or other friction material, in order to prevent the clamped bottle from turning relative to the respective shoe 45. The free end of each arm 44 is provided with a turnable roll 46. A stationary cam 47 is rigidly secured to the frame 15. A series of torsion springs 48 are provided for urging the respective rollers 46 to contact with the stationary cam 47. Each torsion spring 48 has one end thereof connected to the respective arm 43 and the other end of said spring is connected to an edge of plate 33.

Figure 5:
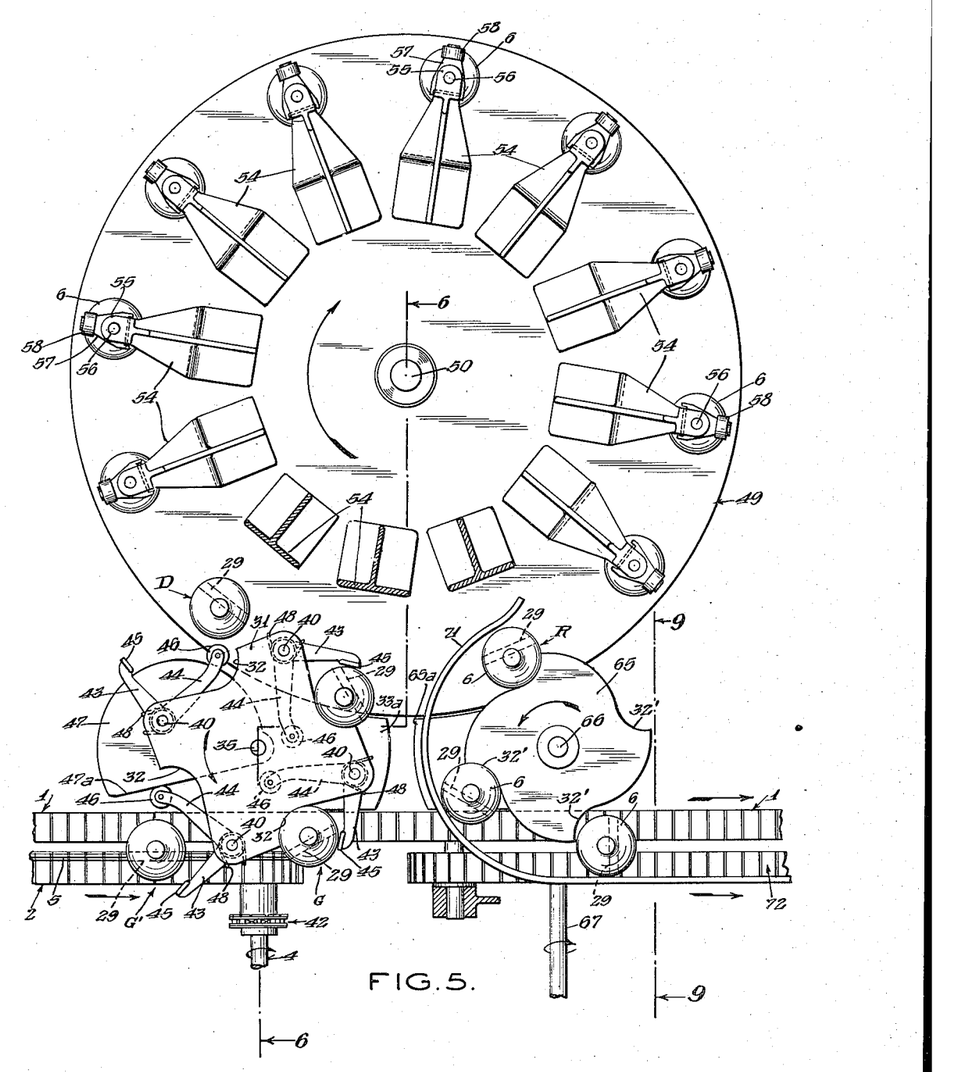
Fig. 5 is an enlarged top plan view of the turntable and of the inlet transfer mechanism for transferring bottles thereto from the inlet conveyor means, and of the outlet transfer mechanism for transferring the bottles from the turntable to the first outlet conveyor means.

When a bottle is between the position G' of Fig. 5 and the next succeeding position G, said bottle is gripped between the clamping shoe 45 of the respective arm 43, and the walls of the respective superposed pockets 32. In said gripped position, the groove 29 of the respective bottle has been released from the respective spotting rib, or the bottle will be released from said rib soon after the bottle has been gripped. In any event, the bottle will be released from the respective rib 5, before the bottle is moved laterally relative to the respective rib. The bottle is thus released by the downward movement of the respective rib 5 at the end of the top run of chain 2, while the top run of chain 1 holds the respective bottle against downward movement.

The cam 47 has a straight edge 47a, which is inclined to the direction of movement of the straight and planar top runs of the conveyors 1 and 2. In Fig. 5, the shaft 35 and its plates 31 and 33, are shown as rotatable in the counterclockwise direction.

When a bottle is in the position G', the roll 46 of the respective arm 44 abuts said straight edge 47a. The torsion spring 48 urges the arms 44 and 43 to turn in unison in clockwise direction, but the straight edge 47a then acts as a stop for the roll 46, so that the shoe 45 is then held spaced from the bottle which is in position G'. Said bottle has been spotted when it is in position G'. The shaft 35 is turned in unison with the conveyors 1 and 2, so that the roll 46 which corresponds to position G', is turned away from straight edge 47a, so that the respective torsion spring 48 can turn the respective arm 43 clockwise to the clamping position. Even if the bottle loses the support of conveyor 2 before the respective arm 43 is in final clamping position, said clamping arm 43 is then almost in final clamping position, so that the bottle can tilt only slightly from its vertical position, before the bottle is positively and rigidly clamped by the respective arm 43.

Each bottle is thus clamped intermediate the positions G' and G, and immediately before or after the respective bottle loses the support of the conveyor 2.

It is preferred to clamp the bottle, just before it is released from the respective rib 5. Between the positions G' and G, the respective stud 40 is moved in a direction which is substantially parallel to ribs 5, and after the bottle has been clamped, it is moved substantially in said direction. Hence the bottle can be clamped and then moved a short distance without being moved laterally relative to ribs 5, and the lateral movement begins only after the respective rib 5 has cleared the respective groove 29. If desired, the bottle can be clamped after the respective rib 5 has partially or wholly cleared the respective groove 29. These alternative results can be secured by correspondingly predetermining the length of the top run of chain 2, after the position G'.

The groove 29 of the clamped bottle is perpendicular to the respective radius of the plate 31, which is drawn from the center of shaft 35 to the central point of said groove 29. The grooves 29 are maintained perpendicular to said respective radii, as each bottle is moved by the inlet transfer mechanism over the fixed plate 33a to the turntable 49. Said plate 33a is fixed to the frame of the machine, and the bottom wall of each bottle slides upon the top wall of said plate 33a.

Each rib 5 may be of sufficient length to completely fill a groove 29, or a groove 29 may be filled by two or more ribs 5.

Each bottle 6 has been released from the respective clamping arm 43, when the bottle is on the turntable 49, in the position marked D in Fig. 5. In the two positions intermediate G and D, the respective roll 46 is spaced from the curved edge of cam 47, and in the position next preceding D, the bottom wall of the respective bottle rests partially on the top wall of the fixed plate 33a and partially on the turntable 49.

As the bottle is moved to position D, from the next preceding position, the respective roll 46 is pushed against the curved surface of cam 47, thus turning the respective arm 43 out of clamping engagement with the respective bottle.

When a bottle 6 is in the position D, its groove 29 is perpendicular to the respective radius of turntable 49, which is drawn to the center of said groove 29. The bottle is maintained in this position, up to and including the position R. The turntable 49 has a hub which is keyed to a shaft 50, which is journalled in the frame 15 of the machine. Keyed to shaft 50 is a bevel gear 51, which meshes with a bevel gear 52 which is fixed to the shaft 53. Shaft 53 has bevel gear 52a fixed thereto, and said gear 52a meshes with bevel gear 36, which, as previously stated, meshes with bevel gear 37 of shaft 38. As previously stated, shaft 38 is driven by shaft 4, by means of chain 42.

The turntable 49 is provided with a series of standards 54. Each standard 54 is provided with a pair of superposed horizontal collar-flanges 55. A rod 56 is slidable in each pair of flanges 55. Each rod 56 has a collar 57 detachably fixed thereto, and each collar 57 is provided with a turnable roll 58. Each rod 56 is provided with a compression spring 59, whose upper end abuts the respective top flange 55, and whose lower end abuts the respective collar 57. Each rod 56 is therefore downwardly biased by the respective spring 59. Each rod 56 is provided with a cup-shaped head 60, which is made of resilient material or which has a lining of resilient material. Each head 60 is operated to enclose the neck of the respective bottle when or prior to the time the bottle is released by the respective clamping arm 43. Each head 60 clamps the respective bottle against the turntable 49 when or immediately prior to the time when the respective bottle is released by the respective arm 43, so that each bottle is held spotted on the turntable 49, while the labels or the like are applied at one or more stations, and up to the position R.

A cam 61, which has tapered end portions 62 and 63, is suitably fixed to the frame of the machine. As shown in Fig. 5, the turntable 49 is rotated in the clockwise direction. Each roll 58 successively moves upwardly along the inclined surface of the end-portion 62 until said roll 58 rides along the horizontal top surface 64 of the cam 61. While each roll 58 contacts with said surface 64, the respective clamping head 60 is spaced vertically from the respective bottle. As soon as each roll rides off the end-portion 63, the respective head 60 is in the position indicated at D in Fig. 7, in which the top of the respective bottle is enclosed by the head 60, and said bottle is preferably firmly clamped against the top wall of the turntable 49. The positions D in Figs. 5 and 7 are the same.

I have not disclosed the mechanism for applying labels or the like to the bottles at one or more stations, while the bottles are moved in unison with and said bottles are clamped to the turntable 49, as this is no part of my invention.

Figure 9:
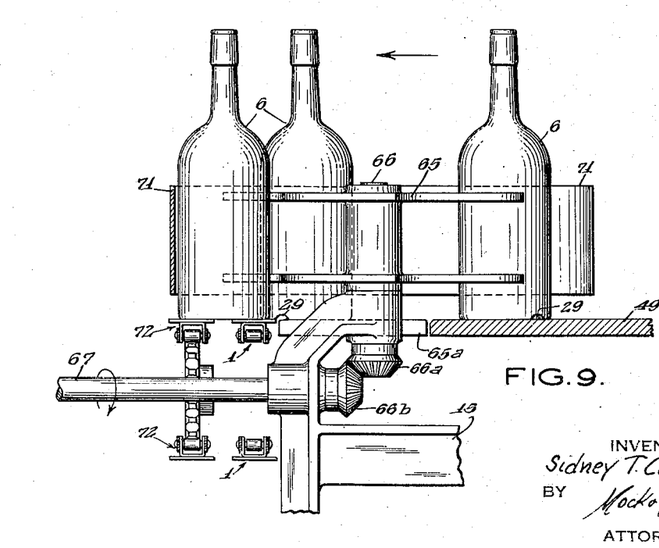
Fig. 9 is a sectional view on the line 9—9 of Fig. 5.
Figure 10:
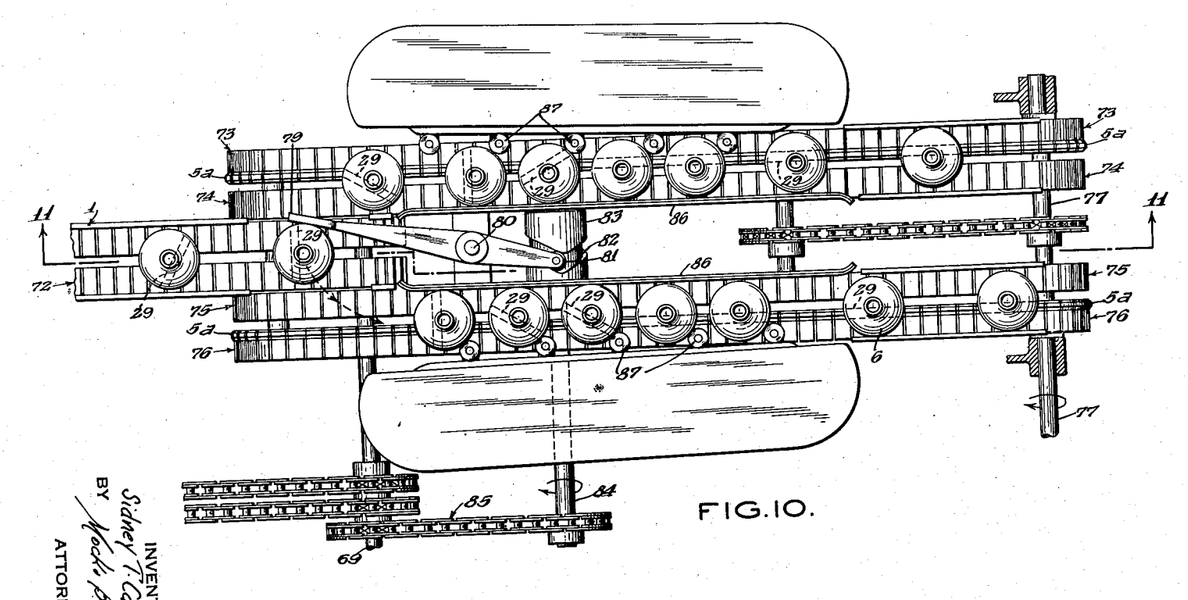
Fig. 10 is an enlarged top plan view of the outlet part of the machine, which is shown at the right of Fig. 1.

As each bottle comes to the position indicated by the reference letter R in Fig. 5, the respective roll 58 rides upwardly along the top surface of the end-portion 62, in order to raise the respective clamping head 60 wholly above the top of the respective bottle, so that the respective bottle can be transferred from the turntabe 49 to the first outlet conveying means, by means of the outlet transfer member 65. This is of conventional construction. A fixed plate 65a slidingly supports the bottom walls of the bottles, during this transfer to the first outlet conveying means. The outlet transfer member 65 is fixed to a shaft 66. As indicated in Figs. 1 and 9, the bottom of the shaft 66 has a bevel gear 66a which is fixed to said shaft 66 and which meshes with a companion bevel gear 66b which is fixed to the horizontal shaft 67. The shaft 67 is driven by means of a sprocket and chain drive, which includes the chain 68, from a shaft 69. The shaft 69 is driven by a sprocket and chain drive, which includes the chain 70, by any suitable motor. The shaft 69 is continuously rotated, and it is the drive shaft of the mechanism.

The movement of each bottle off the conveyor 49, is guided by curved guide rails 71.

At the outlet transfer mechanism, the conveyor 1 is associated with a companion conveyor 72. The straight and planar top run of the conveyor 1 is at the same level throughout. This companion conveyor 72 is of the endless chain type previously mentioned. The outlet conveyor 72 is not provided with any spotting mechanism. The conveyors 1 and 72 comprise the first outlet conveyor means.

The bottles are moved laterally off the chain conveyors 1 and 72, to respective pairs of outlet feed conveyors, which comprise the second outlet conveyor means. The first pair comprises the conveyors 73 and 74, and the second pair comprises the conveyors 75 and 76. The conveyors 13, 74, 75 and 76 are actuated by sprockets on the shaft 77, which is actuated by the shaft 69, through a suitable sprocket and chain drive, which includes the chain 78.

Figure 11:
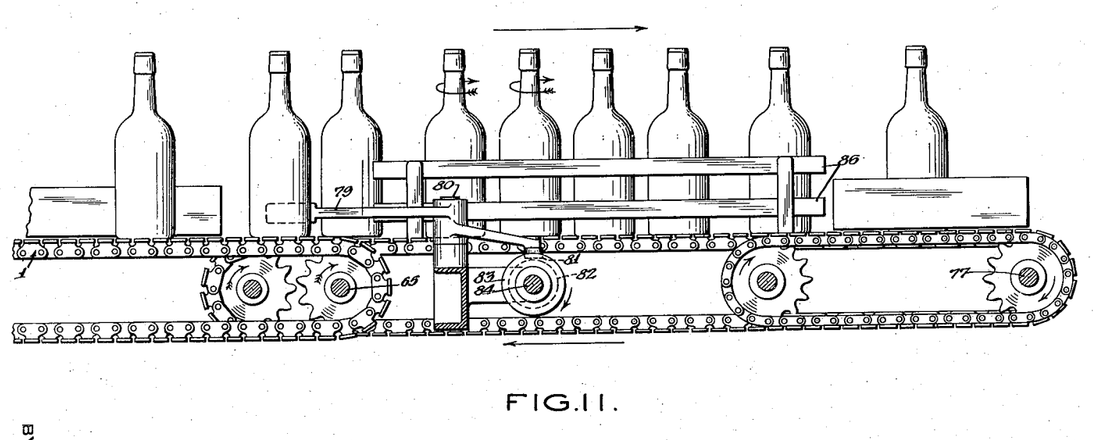
Fig. 11 is a sectional view, partially in elevation, on the line 11—11 of Fig. 10.

An oscillating transfer lever 79 transfers the bottles alternately from the pair of first outlet conveyors 1 and 72, to one of the pairs of second outlet conveyors 73 and 74, 75 and 76. The transfer lever 79 is mounted turnably on a pivot pin 80, which is fixed to the frame of the machine. The transfer lever 79 has a roll 81, which is shown in Figs. 1 and 11. This roll 81 is located in the cam groove 82 of a cam sleeve 83, which is fixed to the shaft 84. The shaft 84 is driven by the shaft 69, by means of a sprocket and chain drive which includes the chain 85. The cam groove 82 oscillates the lever 79, so that alternate bottles are transferred to the respective pairs or units of the second outlet conveyor mechanism. Bottles are thus transferred alternately to the conveyors 73 and 74, and to the conveyors 75 and 76. Longitudinally stationary rails 86 are provided at the respective adjacent sides of the conveyors 74 and 75. While the bottles are moved on the respective pairs of conveyors 73 and 74, 75 and 76, said bottles contact with turntable rolls 87 which are mounted on chains 21, which are identical with the previously described chain 21.

The rails 86 have the same function as rails 28.

The conveyors 73 and 76 are provided with spotting ribs 5a, which are identical with the spotting ribs 5, so that the respective bottles are spotted while they are located on the pair of conveyors 73 and 74, or on the pair of conveyors 75 and 76. This permits ready inspection of the work and it is valuable for other purposes.

It will be noted that each chain conveyor is driven at the outlet or right-hand end thereof. For example, the shaft 77 actuates the conveyors 73 and 74, 75 and 76. The shaft 69 actuates the conveyors 1 and 72. The shaft 4 actuates the chain conveyor 2.

While some of the shafts are driven by sprocket and chain drives instead of gears, the designation "gear ratio" may be used to indicate the relations between the speeds of rotation of the respective shafts. This relation is based upon the rotation of the turntable 49. As shown in Fig. 1, twelve bottles are located upon the turntable 49. The inlet transfer mechanism which supplies the bottles to the turntable, and which comprises the plates 31 and 33, has pockets for only four bottles, so that the plates 31 and 33 turn three revolutions for each revolution of the turntable 49. The superposed plates 65 which deliver the bottles from the turntable to the conveyors 1 and 72, also have four pockets, so that the shaft 66 turns three revolutions for each revolution of the turntable 49.

The plates 8, which space the bottles, are provided with eight pockets, so that said plates turn in unison 1.5 (one and one-half) revolutions for each revolution of the turntable 49. The shaft 25 turns six revolutions for each revolution of the turntable 49.

As previously stated, the conveyors 73 and 74 are associated with a chain which is identical with the chain 21, and the conveyors 75 and 76 are associated with another chain of this type. The actuating shaft of each of the last-mentioned chains turns three revolutions for each revolution of the turntable 49, because the alternate lateral feeding of the bottles to the conveyors 73 and 74, and to the conveyors 75 and 76, makes it possible to slow down the speed of these conveyors.

The cam shaft 84 is turned six revolutions for each revolution of the turntable 49. The shaft 77 is turned three revolutions, for each revolution of the turntable 49.

The complete operation of the machine is as follows:

The bottles are placed in unspotted relation upon the chain conveyors 1 and 2, anterior the spacing means 8. Said spacing means 8 automatically space the bottles. The bottles are then automatically spotted and held in spotted relation, while said bottles are moved in unison with chain conveyors 1 and 2. The spotted bottles are then transferred successively to the turntable 49, on which each bottle is immediately clamped, to be held on the turntable in spotted position. Each bottle moves in unison with the turntable 49, until the bottle is released from said clamping means, and it is transferred to the conveyors 1 and 72.

The bottles are then alternately transferred to the chain conveyors 73 and 74, 75 and 76, on which the bottles are again automatically spotted and held in spotted relation.

I have disclosed a preferred embodiment of my invention, but it is clear that numerous changes and omissions can be made without departing from the spirit thereof, and that the invention includes numerous valuable sub-combinations, which can be used independently of the complete machine illustrated herein.

I claim:

1. Mechanism for transporting and spotting bottles which have spotting grooves in their bottom walls, comprising a first endless conveyor and a second endless conveyor, said conveyors having adjacent straight and parallel runs, the first conveyor being free from spotting means, the second conveyor having spotting ribs which are shaped to enter the respective spotting grooves of the respective bottles, each bottle being supported on both said runs when the respective bottle is spotted and also prior to the spotting thereof, drive means adapted to actuate said conveyors so that said runs are longitudinally actuated in unison and at the same speed, friction means adapted to turn each bottle around its own vertical axis while the respective bottle is supported on said runs, until the spotting groove of the respective bottle is entered by a respective rib which locks the bottle against further turning movement around its own axis, a turntable, transfer means adapted to clamp and to transfer the spotted bottles successively at a predetermined transfer point from said conveyors to said turntable and to release the bottles at a predetermined point of release after the bottles have been deposited on the turntable, said run of the first conveyor extending beyond the transfer point, said run of the second conveyor extending only up to said point, so that the bottles rest partially on the first conveyor and the spotting grooves of said bottles are free from the spotting ribs at said transfer point, means adapted to actuate said transfer means and said turntable in unison with said conveyors.

2. Mechanism according to claim 1 in which said turntable has a plurality of clamping devices mounted thereon, each said clamping device being adapted to clamp a bottle which is located on the turntable and to hold the respective bottle from turning around the axis of said respective bottle, automatic control means for said clamping devices adapted to hold each clamping device inoperative directly anterior said point of release and to permit each clamping device to move to operative position substantially at said point of release, each clamping device being biased to operative position.

3. Mechanism for transporting and spotting bottles which have spotting grooves in their bottom walls, comprising supporting endless conveyor means adapted to support the bottles at their bottom walls at a supporting portion of said endless conveyor means, mechanism for moving said supporting portion and the upstanding bottles thereon in a predetermined direction of feed, said conveyor means having spotting ribs which are substantially aligned with said direction of feed, a stationary friction rail which is substantially parallel to said direction of feed and which is located to abut said upstanding bottles and to turn said upstanding bottles around their respective vertical axes, an auxiliary endless conveyor which has longitudinally spaced rolls mounted thereon, said auxiliary conveyor having a run which is adjacent to and parallel to said supporting portion, drive mechanism which drives said supporting conveyor means and said auxiliary endless conveyor in unison and at the same speed, spacing mechanism located anterior said auxiliary endless conveyor and spacing the bottles so that each unspotted bottle which is located after said spacing means contacts simultaneously with said friction rail and with a respective roll, said spotting grooves being tapered, said ribs being correspondingly tapered and being located to move the bottles which are spotted by said ribs laterally away from and out of contact with said friction rail.

4. Mechanism for transporting and spotting bottles comprising a turntable, a rotatable transfer device having circumferentially spaced pockets to receive respective bottles, each said pocket having a clamping arm and a control arm associated therewith, each said clamping arm and the respective control arm being pivotally connected to said transfer device and turning in unison relative to said transfer device, each said clamping arm being biased to clamping position in which it will clamp a bottle against the wall of the respective pocket, a stationary cam whose cam wall is located to contact with said control arm at a transfer point at which a bottle is fed into a respective pocket and also at a release point in which a bottle is released from the respective pocket, said cam wall being shaped to hold each clamping arm spaced from the wall of the respective pocket at said transfer point and to permit said clamping arm to be biased to clamping position up to said release point and to move the clamping arm to inoperative position at said release point, conveying means which have spotting means and which are adapted to convey spotted bottles in spaced relation towards the pocket which is located at said transfer point and to release the bottles from said spotting means substantially at said transfer point, the bottle which is clamped at the transfer point being moved in unison with said transfer device in a direction which is lateral to the movement of said conveyor means and which is lateral to said spotting means, drive mechanism which actuates said conveying means and said transfer device in unison.

5. Mechanism for transporting and spotting bottles, comprising conveyor means for feeding upstanding bottles to a transfer point, said conveyor means having upstanding spotting ribs which are substantially parallel to the direction of feed, bottle-rotating means located anterior said transfer point and rotating the upstanding bottles around their respective axes until said spotting ribs enter spotting grooves which are provided in the bottom walls of said bottles, so that each bottle is located anterior said transfer point, a rotatable transfer device located at said transfer point, said transfer device having clamping devices connected thereto at spaced pivot points, said clamping devices being biased to operative clamping position, each clamping device clamping a bottle to said rotatable transfer device at the transfer point and releasing the bottle from the transfer device at a subsequent release point at which the bottle is spaced from said conveyor means, automatic means adapted to hold each clamping device in inoperative position at said transfer point and releasing said clamping device before the bottle is moved off said conveyor means and again holding said clamping device in inoperative position at said release point, the pivot point of each clamping device being moved in a direction which is substantially parallel to said spotting ribs at and directly behind said transfer point, the bottle being at least partially supported on said conveyor means while it is clamped by the respective clamping device, said mechanism releasing the bottle from said spotting ribs substantially at said transfer point, a supplemental movable conveyor to which the bottles are successively delivered in spotted relation.

6. Mechanism for transporting and spotting bottles comprising a first endless conveyor which has superposed straight runs and which is free from spotting ribs, a second endless conveyor which also has superposed straight runs, the respective top runs of said endless conveyors being substantially horizontal and planar and parallel to each other, the adjacent and inner longitudinal edges of said top runs being spaced laterally from each other, the second conveyor having upstanding longitudinal spotting ribs at its respective adjacent inner longitudinal edge, said spotting ribs being substantially parallel to said top runs, a third endless conveyor having a straight operative run which is closely adjacent to the top run of the second endless conveyor, the second endless conveyor being located between the first endless conveyor and the third endless conveyor, said third endless conveyor having outward spaced lateral projections on which rolls are respectively mounted, said rolls overlying the top run of the second endless conveyor in the operative run of the third endless conveyor, a stationary friction rail which is opposed to said operative run and which is located at the outer longitudinal edge of the first endless conveyor, spacing mechanism located anterior said friction rail and said operative run and automatically spacing the upstanding bottles which are supported on said top runs so that the longitudinal distance between the axes of the consecutive spaced bottles is substantially the same as the longitudinal distance between respective rolls.

SIDNEY T. CARTER.